United States Patent
Faure

[15] 3,670,458
[45] June 20, 1972

[54] PROGRAMMED CONTOURING MACHINE FOR MACHINING, BY TOOL HEADS, IRREGULARLY SHAPED WORKPIECES

[72] Inventor: Robert Faure, La Garde-Freinet, France
[73] Assignee: ACME Maschinenfabrik GmbH, New Isenburg, Rathenaustr, Germany
[22] Filed: Jan. 28, 1971
[21] Appl. No.: 110,495

[52] U.S. Cl. ................................51/135 R, 51/53, 51/108, 51/134
[51] Int. Cl. ........................................B24b 5/00, B24b 29/00
[58] Field of Search ...........................51/53, 108, 134, 135 R

[56] References Cited

UNITED STATES PATENTS

| | | | |
|---|---|---|---|
| 2,272,055 | 2/1942 | Carlson | 51/108 R |
| 2,377,992 | 6/1945 | Carlson | 51/53 |
| 2,507,998 | 5/1950 | Russell | 51/108 R |
| 2,671,913 | 3/1954 | Kirsch | 51/108 R X |
| 2,880,557 | 4/1959 | Todd et al | 51/134 |

*Primary Examiner*—Othell M. Simpson
*Attorney*—Flynn & Frishauf

[57] ABSTRACT

A turret table, indexed by an indexing mechanism, carries along its circumference a plurality of work piece spindles on which work pieces, to be shaped, may be mounted. Fixed beneath the turret are a plurality of cams, one group of cams for each work station, which are revolved synchronously. A cam follower on one cam acts to deflect track portions of a roughly circular, articulated endless track. Each spindle is linked to a runner, running on the track which, as it is deflected by the cam follower, transfers deflecting motion to the spindle to present the work piece in predetermined attitudes to the machine tool head. Additional cam means can be provided at each station to selectively and in accordance with the programmed rotation of the cam, twist, start or otherwise orient the work piece head, such as a grinding belt or the like, with respect to the work piece.

16 Claims, 17 Drawing Figures

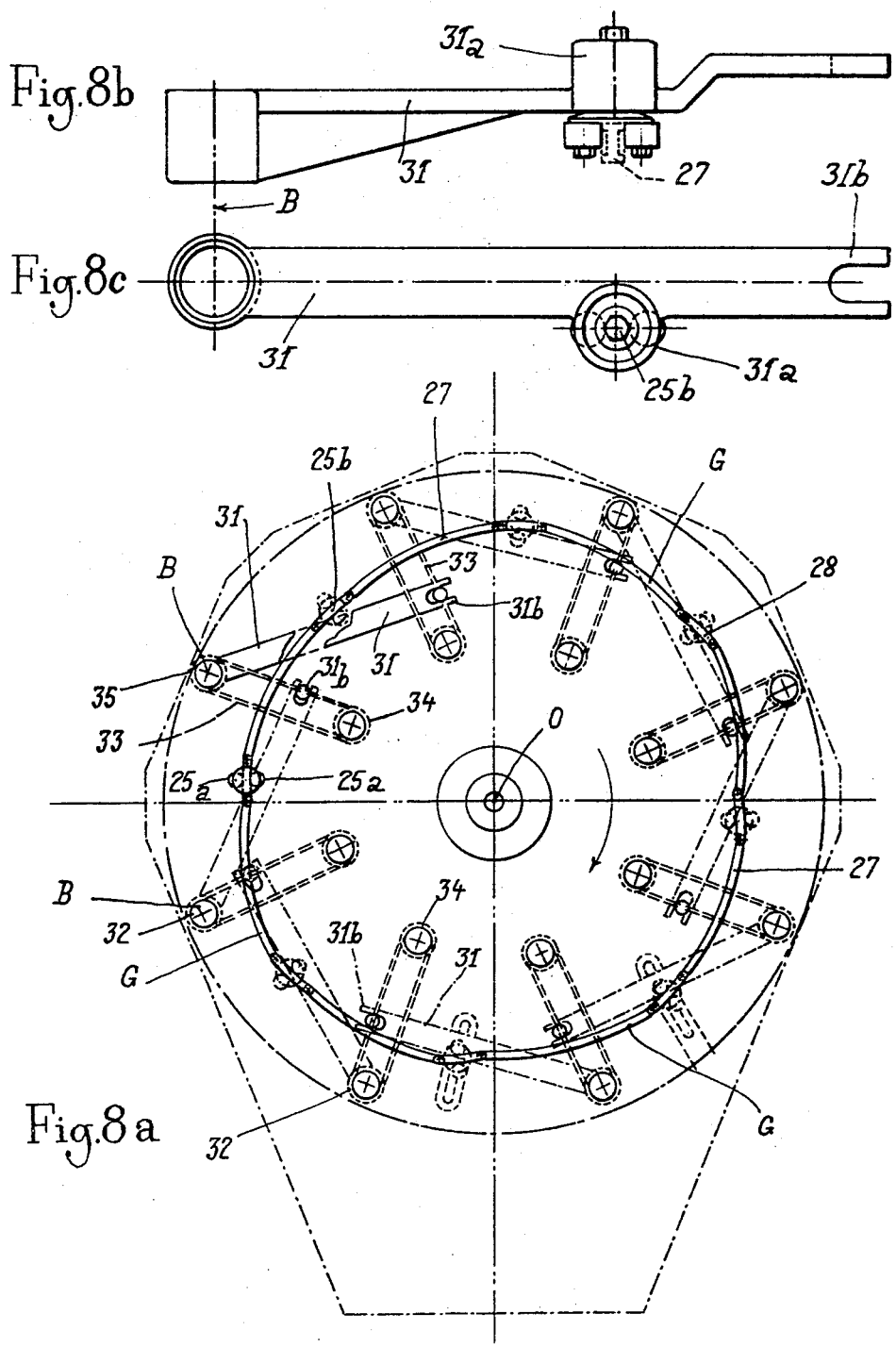

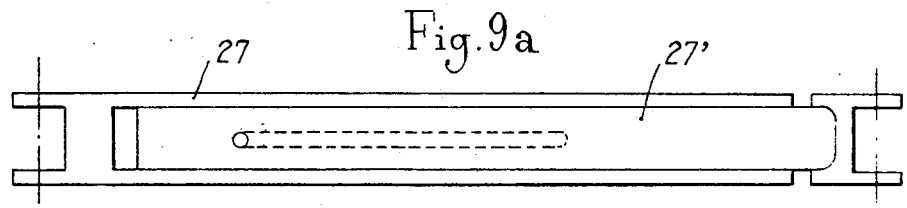
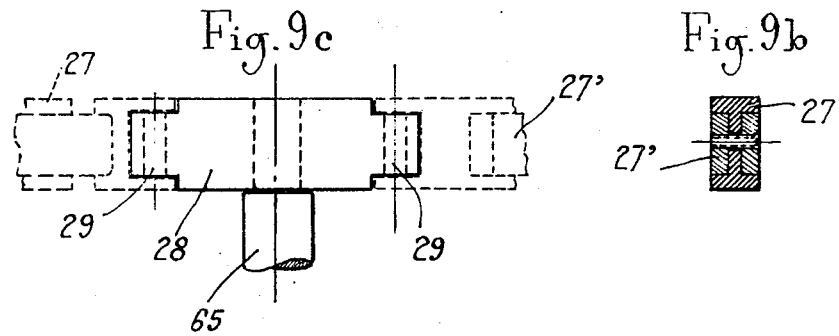
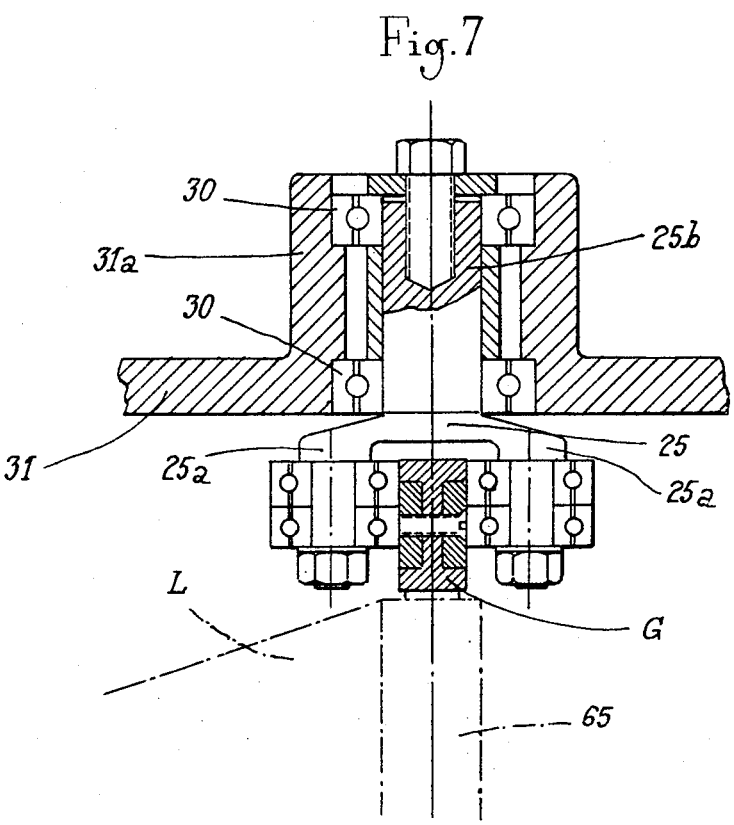

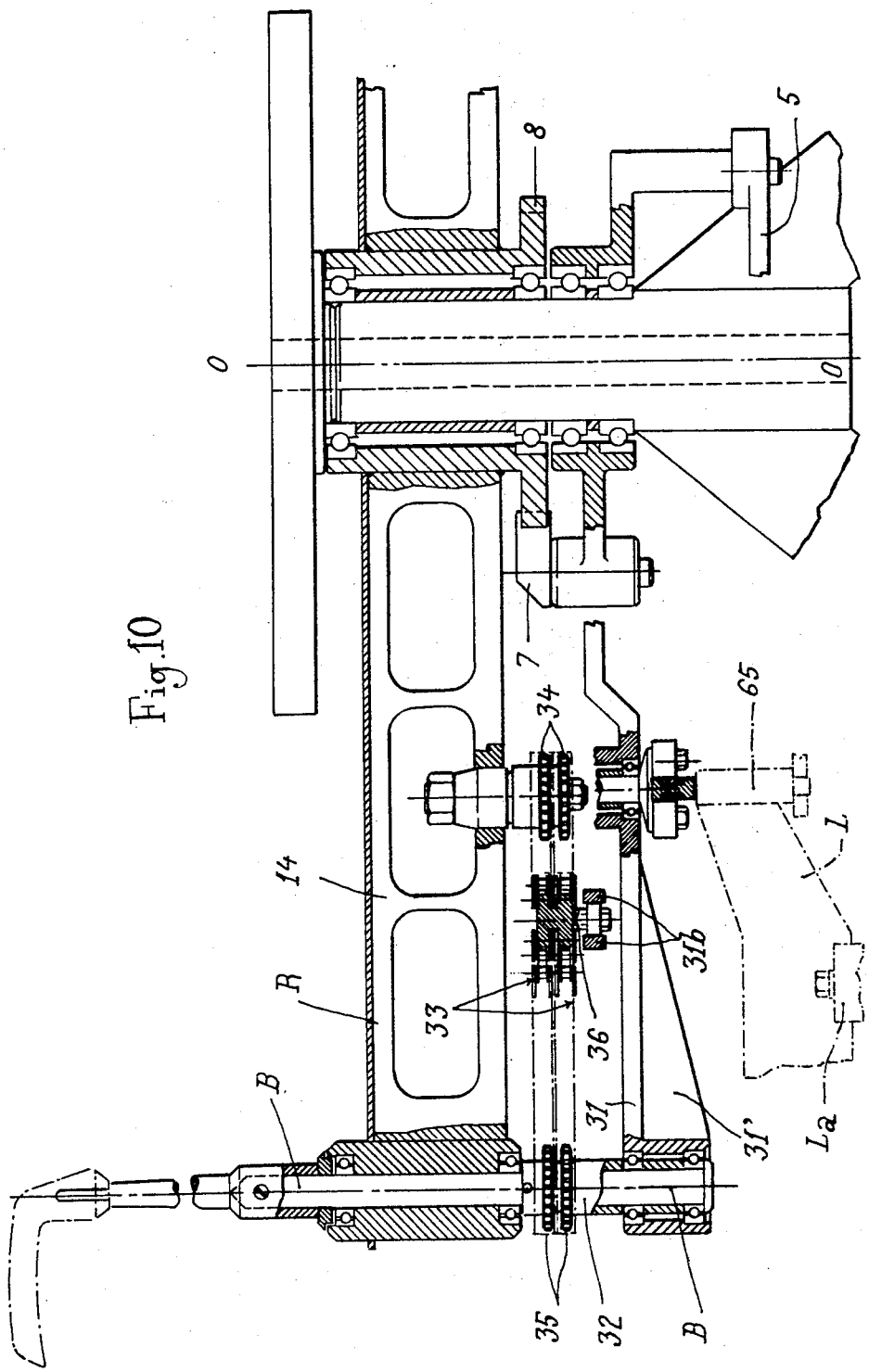

PROGRAMMED CONTOURING MACHINE FOR MACHINING, BY TOOL HEADS, IRREGULARLY SHAPED WORKPIECES

The present invention relates to a programmed contouring machine for the shaping of irregularly formed work pieces and, more particularly, to such a machine which permits a wide variety of operations to be carried out on work pieces having highly irregular surfaces.

Machines have been proposed in which multiple work stations are provided, located on an indexing turret which, as it indexes past work heads, presents various surfaces of the work piece to the working heads. In these machines, the work pieces are usually held fixed on a support while being machined, so that the machining heads can act on the work pieces only with some of their faces. Other machines have been provided on which work pieces can turn about an axis in front of the working head. It has heretofore only been possible, however, to machine such work pieces about partial, or total, surfaces or revolution.

The present invention relates to a machine in which a turret, or work piece carrier, turns step by step, and indexing in front of a plurality of working heads, is so arranged that the work piece, as well as the machining head, may be aligned, one with respect to the other, and in accordance with the location of the turret, such that relative translation as well as rotation about three different axes may be carried out; thus, the work piece may be presented to the machining head such that all its surface areas may be machined, even if the work piece is of irregular or odd shape. The present invention is, therefore, directed to a machine tool in which work pieces which heretofore had to be hand machined can be automatically machined by machining heads, and it is an object of the present invention to provide a machine structure which permits machining of irregular work pieces with a high degree of flexibility.

SUBJECT MATTER OF THE PRESENT INVENTION

Briefly, the work pieces are located on supports formed as vertical spindles, located at substantially regular intervals around the periphery of a horizontal work table or turret. The work table or turret indexes, step by step, to present the work pieces at a number of work stations, each equipped with machining heads and located about the circumference of the turret. The spindles are so arranged that they may turn or oscillate about their axes under control of profiled cams, one each being located at a work station and rotating in accordance with an operational scheme allocated to a specific work station. Simultaneously, two or more or other cams, turning, preferably synchronously with the first cam, control the work piece itself, and its displacement about at least two other axes of rotation. The additional cams may further control start and stop of the work piece, to occur at times intermediate before rotation of the spindle carrying the work piece so that selected portions of the work piece surface are brought into contact with the working head at selected times, to provide high flexibility in application of the tools on the working head to the work piece.

The cams at the work stations are preferably installed on a common shaft at the bottom of the machine, with cam followers engaging the cams to control the machine tool operation and rotation of the spindle. Rotation of the cams themselves is controlled by a common operating member, such as a chain drive or the like, so that the various operations at the various work stations on the work pieces will be carried out simultaneously, the cams at the various work stations turning in synchronism.

The invention will be described by way of example with reference to the accompanying drawings, wherein:

FIG. 7 is a vertical sectional view, to a greatly enlarged scale, of a runner on the sectionalized rail;

FIG. 8a is a schematic top view looking in the direction of arrow VIII in FIG. 3 and illustrating a track arrangement and the guiding of the runners;

FIG. 8b is an enlarged side view of lever 31;

FIG. 8c is a top view, to an enlarged scale of lever 31

FIG. 9a is a side view of a section of the deflectible track;

FIG. 9b is a transverse sectional view of the rail of FIG. 9a;

FIG. 9c is a detail view of the interconnection of a pair of adjacent track sections;

FIG. 10 is a vertical sectional view, to a different scale and partly distorted, through the central axis of the machine and through the axis of a work piece spindle and illustrating control of rotation of the spindle;

Figure 1:
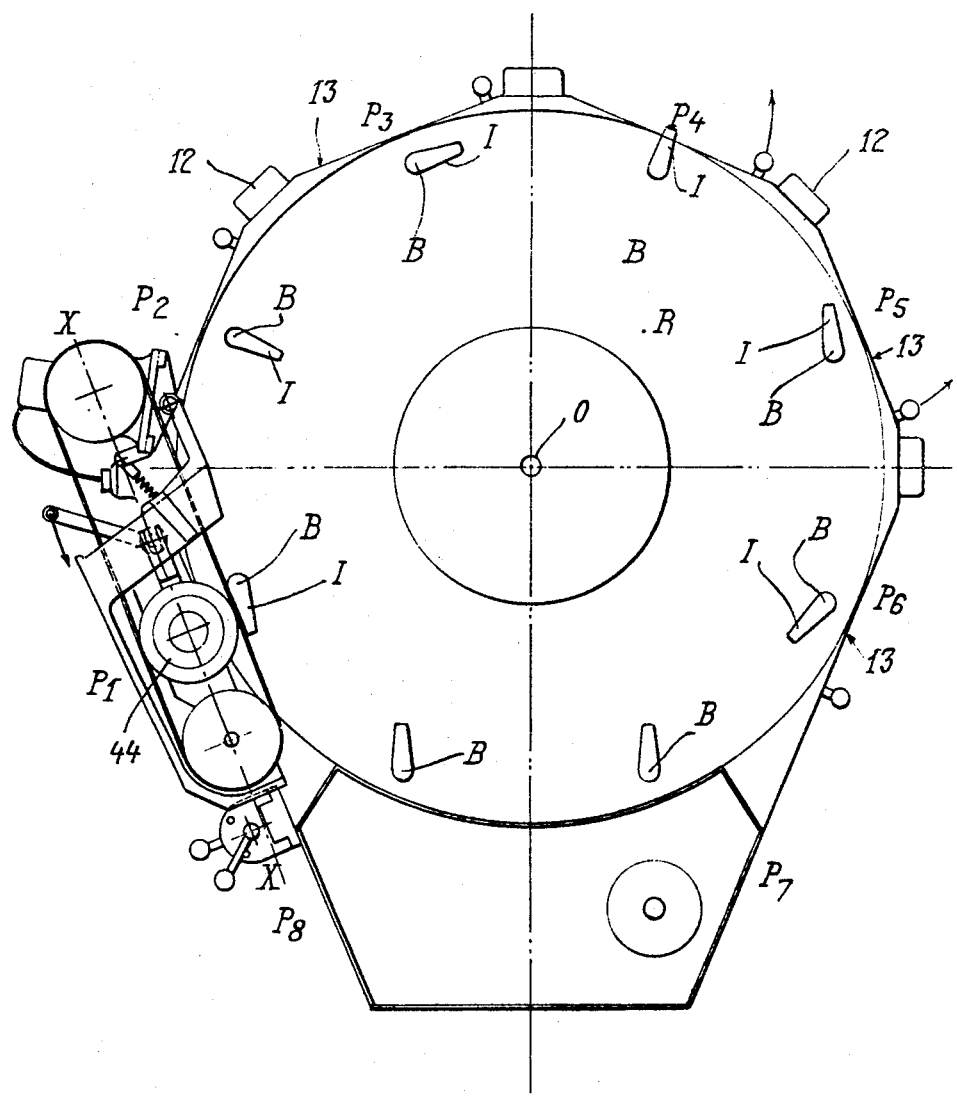
FIG. 1 is a schematic general top plan view of the turret illustrating, schematically, the work pieces located thereon and a single working head, shown as a belt grinder. Working or machining heads at the other work stations have been omitted for clarity.

In FIG. 1, the index turret R has eight work piece holders thereon, passing in front of eight work piece stations P1, P2 . . . P8. Six of these work piece stations, P1–P6, have machine tool heads applied thereto in order to operate on the work pieces passing along the machine tools. The two remaining stations, P7 and P8, are used to charge, or place, new work pieces on the spindle and to remove machined work pieces therefrom. The work pieces I are located on vertical spindles B. Turret table R rotates about a central axis O of the machine.

Figure 2:
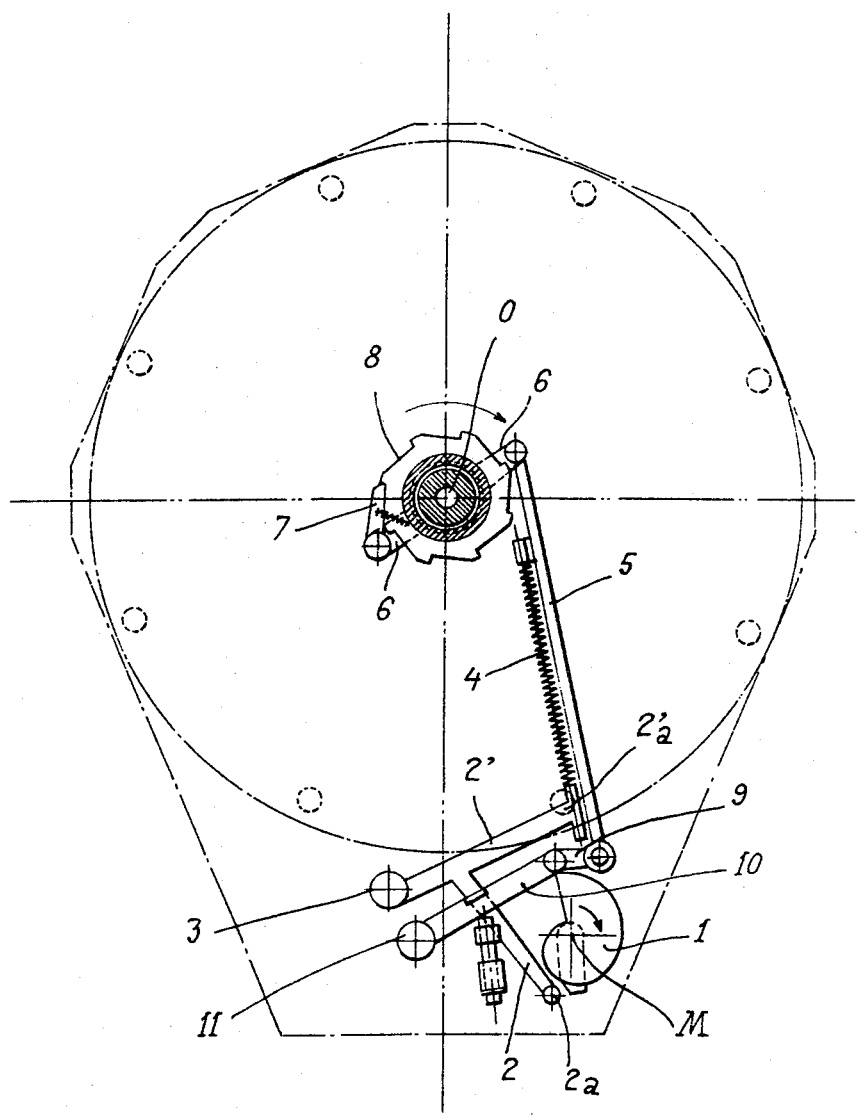
FIG. 2 is a bottom view illustrating the indexing mechanism for the turret of FIG. 1, the main shaft of the turret being taken in section.

When a large turret table, carrying work pieces at its circumference, is being indexed, it is of specific importance that the work pieces be held securely. Thus, indexing shocks resulting upon stepwise rotation of the table, should preferably be avoided. In order to provide for smooth indexing, the mechanism of FIG. 2 is used. A shaft of a motor M is connected to a spiral cam 1 which turns clock-wise, that is, in the direction of the arrow. A cam follower 2a is engaged by the surface of the rotating spiral cam 1. Cam follower 2a forms part of an enveloping lever system 2, 2′, rotatable about an axis 3 fixed to the base of the machine. One end of a spring 4 bears on the free end 2′a of the enveloping lever system 2, 2′. The other end of the spring 4 is secured to a rod 5, journaled to a lever 6 carrying a ratchet 7 which cooperates with a ratchet wheel 8 secured to the shaft connected to the turret. The other end of the rod 5 is connected by means of a short link 9 to an arm 10 which pivots about a fixed point 11.

Ratchet operation: Upon each rotation of the shaft of the motor M, the spiral cam deflects lever 2—2′ and tends to progressively stress spring 4. At the same time, the spiral cam, in contact with lever 10, prevents rod 5 from yielding to spring force. At the moment when, however, the cam 1 passes the small link 9, the spiral cam frees the end of the rod 5. The spring permits the rod 5 to move, and ratchet 7 turns the turret table by one-eighth revolution. The intermediate link 10 decreases the indexing shock which occurs in ordinary, straight, directly acting ratchets, and rapid indexing movement is thus damped.

Figure 3:
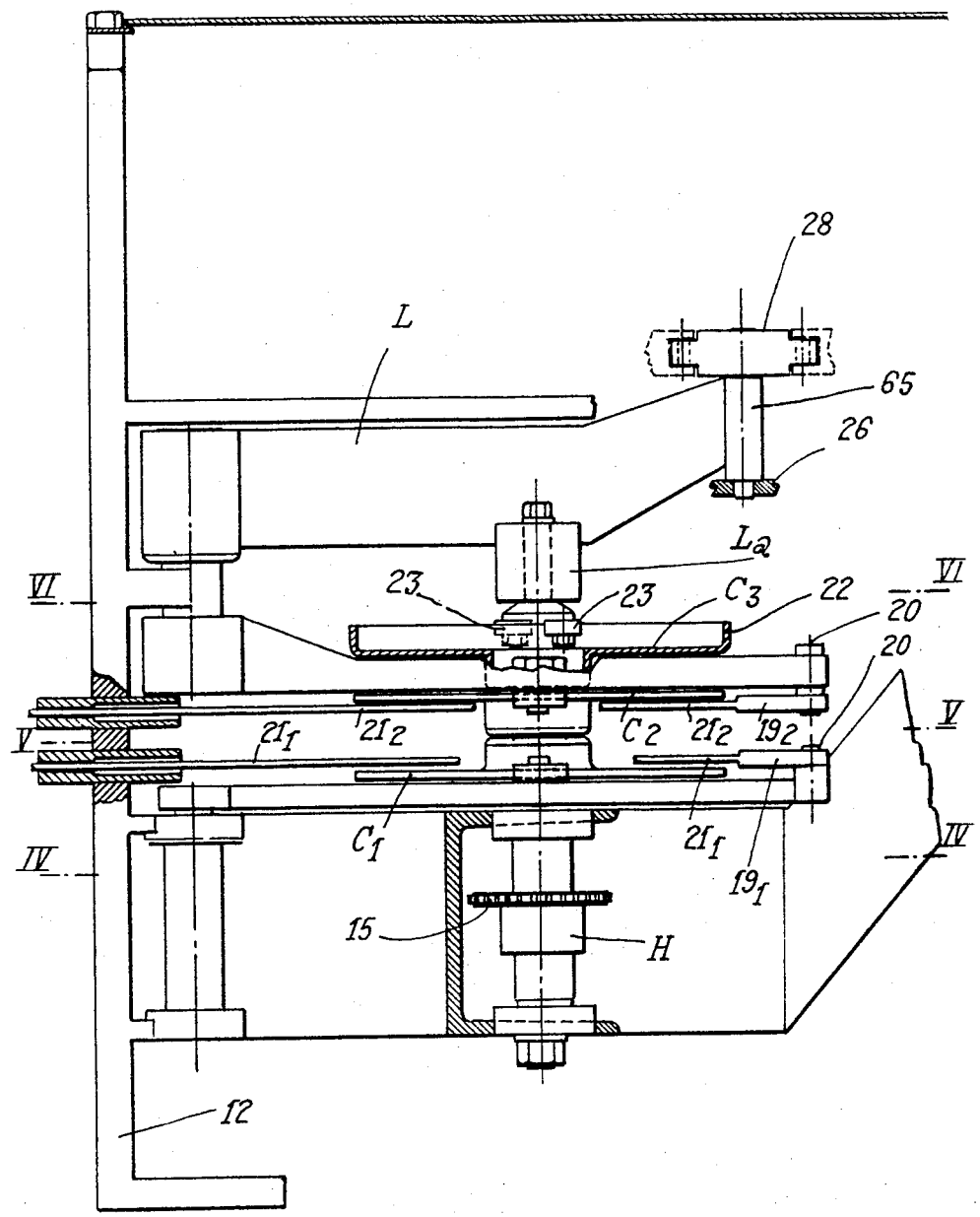
FIG. 3 is a fragmentary vertical section, to a greatly enlarged scale, through an axis of one of the cams controlling operation of a work station.

The control of the operating heads, as well as the turning operation of the spindles I carrying the work pieces B, is obtained from group of cams, one each associated with a work station. Referring now to FIG. 3, a vertical holder 12 supports a protective shroud 13 (FIG. 1) to prevent accidental contacts with the mechanism. Various other components of the machine support are indicated by the general reference numeral 14.

Figure 4:
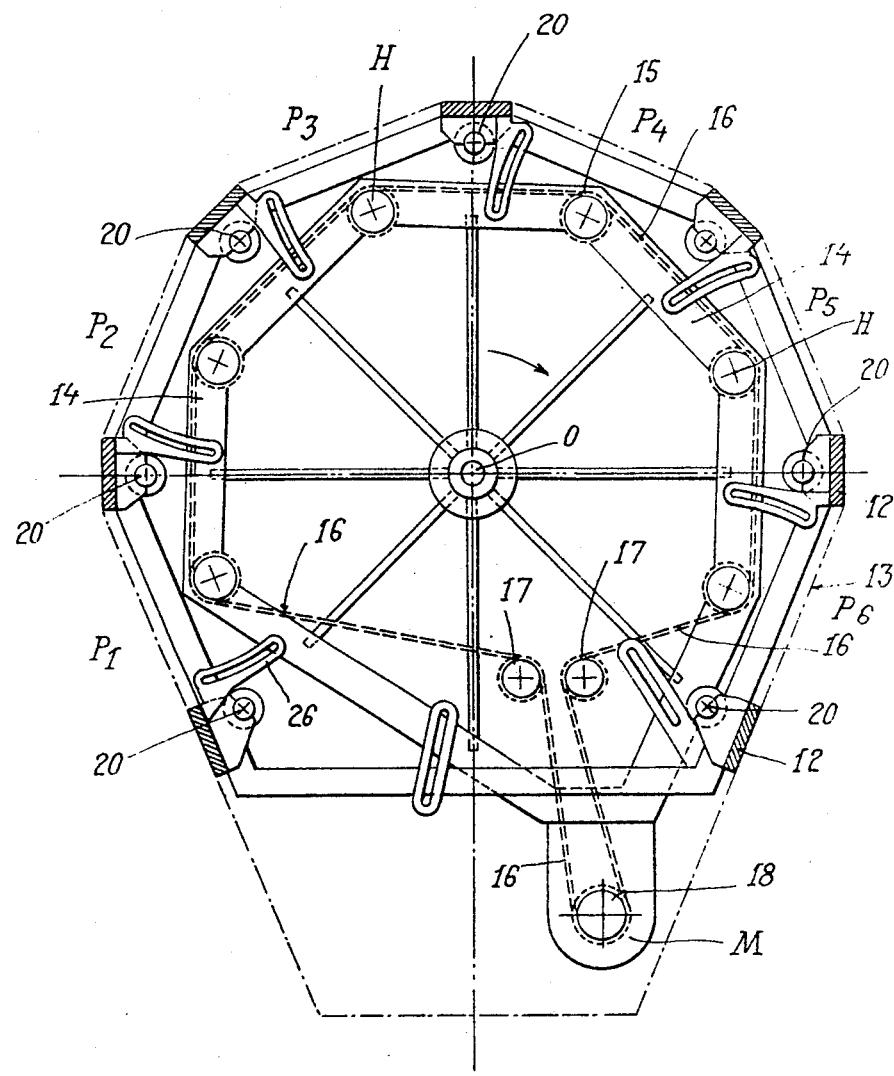
FIGS. 4, 5 and 6 are horizontal sectional views, in progressively descending layers, taken across the machine and in planes indicated at IV—IV, V—V and VI—VI of FIG. 3.

A cam shaft H has a gear wheel 15 secured thereto. All gear wheels 15 of all the cam shafts at the different work stations P1 to P6 are interconnected by an endless chain 16 (FIG. 4) which additionally passes over a pair of idlers 17, 17 and is connected to a sprocket wheel 18 secured to the shaft of the motor M. The gearing connection is such that upon each revolution of the motor M, that is upon each indexing by one-eighth turn of the turret table, the wheels 15 and with it the shafts H make one complete revolution. The chain 16 provides for synchronization of indexing, as well as cam operation. The shaft H (FIG. 3) has located thereon in vertical alignment a group of cams, three cams C1, C2, C3 being shown. The cams C1 and C2 control operation of the machine tool heads; cam C3 controls operation of the work piece spindle B.

Figure 5:
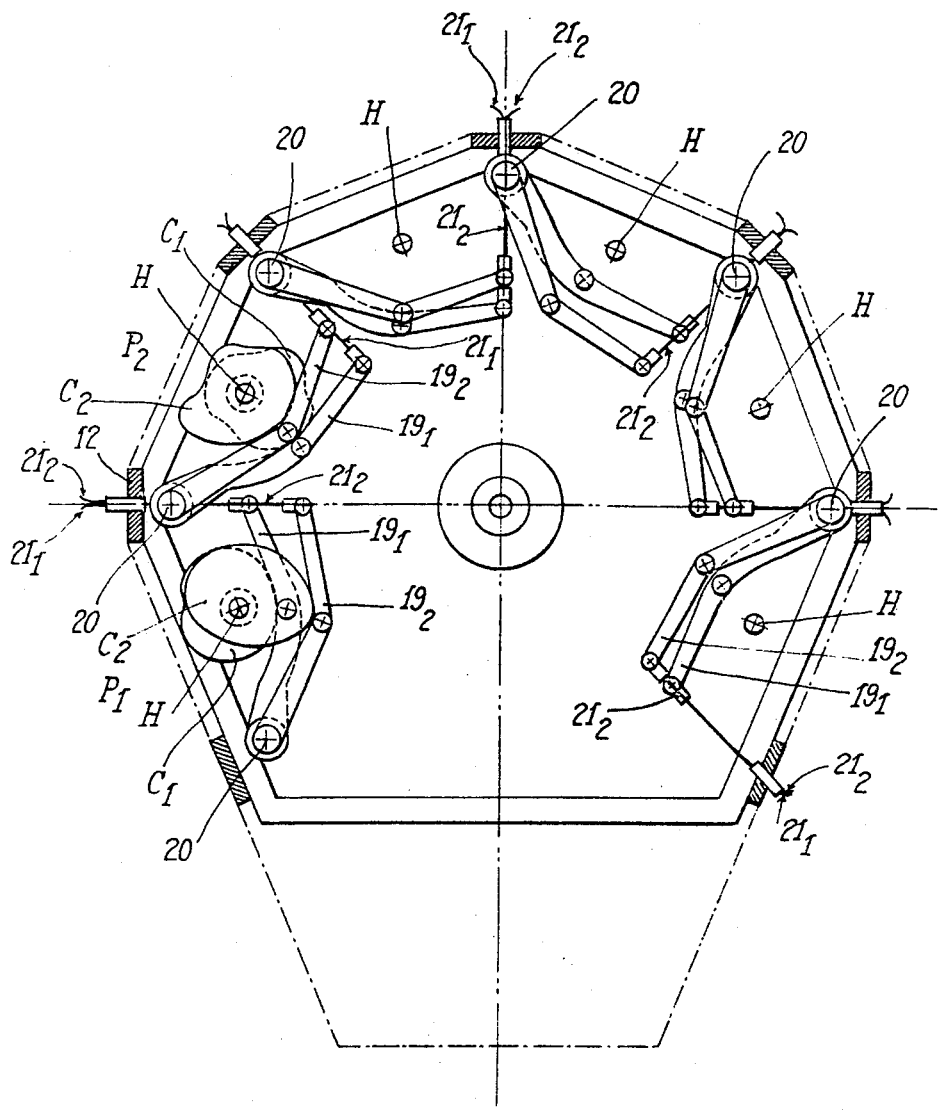

Cams C1 and C2 are flat discs. They are in contact with cam follower levers $19_1$ and $19_2$. Levers $19_1$, $19_2$ (FIGS. 3, 5) can swing about fixed co-axial pivots 20. At their extremities, they are connected to cables $21_1$ and $21_2$, respectively, in the nature of Bowden cables. FIG. 5 illustrates two such cam arrangements, the remaining cams having been omitted for clarity. The levers $19_1$ and $19_2$, together with their control cams C1, C2 carry out movements which are coordinated with the motion which the working heads are to carry out at each work station. The shape of the cams at each work station can, therefore, be different and the cams themselves may have different shapes as required by the operations to be carried out. Each cam follower lever $19_1$, $19_2$ is in contact with its associated cam by a small roller and pulls or release the respective cable $21_1$, $21_2$. How these cables operate the machining heads will be described in detail below, after the movement of the work piece spindle has become clear.

Figure 6:
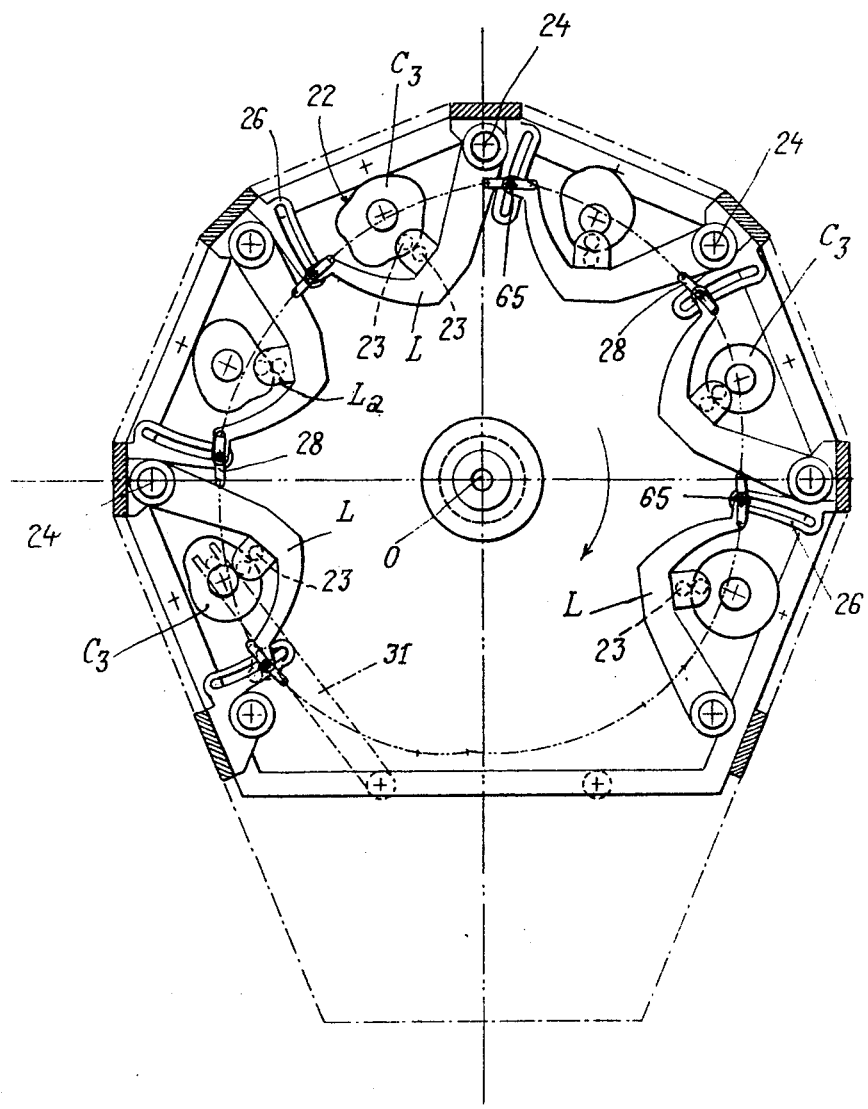

Cam C3 (FIG. 3) is a disc with an upstanding edge 22. A forked cam follower 23, having a pair of rollers on each fork tine, engages the upstanding edge 22. The cam follower 23 is secured to a bowed lever L, swingably mounted about axis 24. The forked cam follower rollers 23 are best seen in FIG. 3; the arrangement of the levers in FIG. 6. The free end of lever L has a rotatable pin 65 secured thereto, which is guided in a guide slot 26 (FIG. 4, FIG. 6) of sector-shaped circular shape, having its center at axis 24. The upper side of pin 65 carries a wing-shaped strip 28, seen in side view in FIG. 3 and FIG. 9c. The wing-shaped element 28 forms a connecting element of an endless guide rail or track G (FIG. 8) of generally circular outline, located beneath the turret R. The guide track G consists of a group of telescoping rail elements, 27, 27' (FIG. 9a), which are interconnected by the wing-shaped elements 28 (FIG. 9c). The telescoping elements, 27, 27', are resilient and can deflect and have a somewhat pre-set circular sector shape. They can slide, one within the other. The wing-shaped elements are linked along vertical axes to adjacent relatively telescoping elements 27, 27', respectively (FIG. 9c). The over-all assembly of the guide track elements 27, 28, 27', etc., forms a closed loop around the center of the machine in which, however, specific locations on the guide track can change in accordance with the instantaneous position of cam follower 23 on cam disc 22. Thus, movement of the individual elements of the guide track is controlled by movement of the cam levers L. The deformation is limited between a large circle, co-axial with the center O of the index table of the machine and corresponding complete extension of the telescoping links 27, 27'; and by a smaller circle corresponding to complete engagement of the telescoping sections 27, 27' with each other. The specific shape of the circle at any instant, and the specific point on a circle with respect to a specific work station will depend on the instantaneous position of the cams C3, acting on cam followers 23.

Each spindle has associated therewith a follower or runner element 25 (FIG. 7, FIG. 10). The follower, or truck runner, is bifurcated to form two arms of a fork, $25_a$–$25_a$, each having a small roller or ball connected thereto and straddling the track G. The top of follower or runner 25 has a central shaft $25b$, interconnected by a pair of spaced ball bearings 30, 30 with a lever 31. The runner 25 is connected to lever 31 somewhat intermediate its length (FIG. 8). Lever 31 is pivoted at one end on a suitable fixed point 32 on the rotating turret R. For simplicity, and preferably, the lever 31 can be pivoted about an extension of the work piece pin B of the next adjacent carrier, as seen in FIG. 8. When the runner 25 is moved laterally on the track, under control of lateral movement due to the lever L moving the links 28, lever 31 will pivot along with it. Swinging movement or oscillations of the lever L, as controlled by the cam C3 thus is transferred over the wing-shaped extensions 28 to the track, to runners 25 and then to lever 31, and transferred by lever 31 into rotary movement of an associated shaft B. The rotary movement imparted to the shaft B with which lever 31 is associated may, for example, be effected by forming the lever 31 with a sprocketed end 31b engaging an endless chain 33 which meshes with sprocketed wheels 35 secured to shaft B (FIG. 10). The chains are passed over idler pulleys 34, secured, for example, to the structure 14 of the turret table R (FIG. 10). Alternate constructions, of course, may be used, such as rack and pinion arrangements interconnecting the link 31 with the shaft B and transferring swinging motion of the link 31 into amplified rotary motion of the shaft B. The endless chain drive has the advantage that control of the shaft B can be obtained without extending any control elements beyond the outline of the work piece holder and the shaft B (see FIG. 10).

The work piece shafts at work piece stations P7 and P8 are not associated with machine tool heads and thus do not require any specific motion to be imparted thereto. They may merely remain free so that work pieces can be simply placed on or moved from the spindles B. No special control cams for these stations need be provided.

The arrangement of the drive for the spindle is best seen in transverse section in FIG. 10, taken through the axis O of the turret as well as through a shaft B to hold a work piece. The ratchet 7 and ratchet wheel 8, secured to the turret table, are located just therebelow; the ratchet is operated by means of push rod 5. At the left side of the drawing, the forked end $31b$ of lever 31 is seen and a lever 31 of a preceding (or subsequent) work station is illustrated, connected to the lower end of spindle B by means of ball bearings. The forked end $31b$ is connected to a link of the chain 33 which controls rotation of the sprocketed wheel 35 splined or otherwise secured to spindle B. To prevent torsional stresses from being imparted by the splined ends 31b acting on a link of the chain, the chain is preferably taken double, as seen in FIG. 10.

Figure 11:
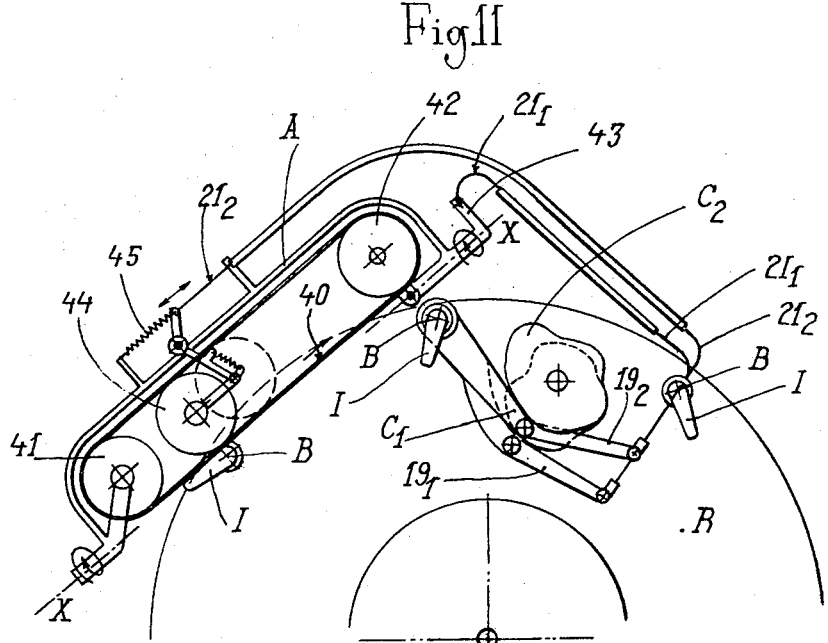
FIG. 11 is a detail top view, to an enlarged scale and somewhat distorted, illustrating control of a belt grinder.
Figure 12:
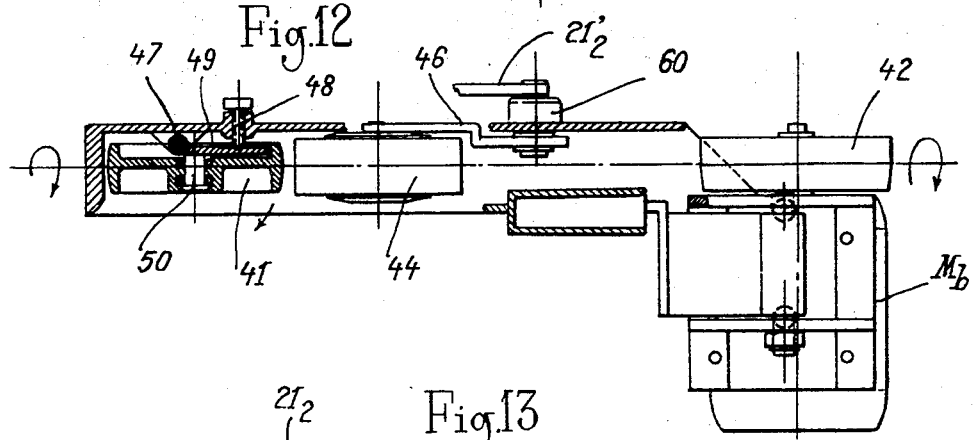
FIG. 12 is a vertical sectional view of the belt grinder of FIG. 11.
Figure 13:
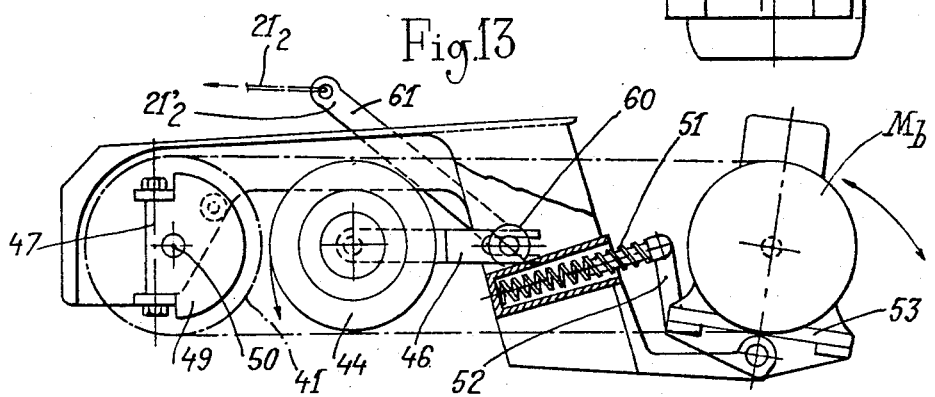
FIG. 13 is a schematic bottom view of the belt grinder of FIG. 11 illustrating the motor and drive arrangement.

Control of the work heads by means of cams C1, C2 and cam followers $19_1$, $19_2$ over cables $21_1$, $21_2$ is best illustrated in connection with FIGS. 11 to 13. A work head, shown as an endless grinding or abrasive belt 40, is mounted on a pair of pulleys 41, 42. The selected surface of the work piece I, mounted on spindle B, is moved in the direction of the abrasive belt 40 in accordance with the control by cam C3, as previously explained. The control cables $21_1$ and $21_2$, controlled by cams C1, C2 respectively, are guided towards the tool head (which may be termed a "backstand") through appropriate tubes, or housings, for example, in the form of Bowden cables. The tool head is mounted to pivot about an axis X—X. The support and its pivotal mounting about the axis is connected to the machine as a whole and has been omitted from the drawing for clarity; the arrangement of a suitable holding frame is a matter of design. The tool head itself is formed with an extending arm 43 to which the end of one of the cables is attached, for example, cable $21_1$, controlled by the cam C1. Upon tension on the cable, the machining head A will rotate about axis X—X. A work contact wheel 44 is located within the loop formed by the abrasive belt 40; it is mounted to be moved by a lever 46, fixed to a shaft 60 which, in turn, is journaled by the support of the machining head. The shaft 60 can be moved by movement of the cable $21_2$ which moves a lever 61 secured to the other end of shaft 60 (see FIG. 12). Upon stress on the cable $21_2$, wheel 44 is moved to swing about an axis perpendicular to the plane of the drawing, FIG. 12. The belt 40 can thus be applied to selected points of the work piece I as the work piece itself turns in a programmed fashion in accordance with the shape of the cam C3. The Bowden cable $21_2$ is pre-stressed by means of a spring 45 (FIG. 11) to provide a counter tension to the cable $21_2$. Rotation of the spindle B carrying the work piece I permits relative displacement between the work piece and the abrasive belt by rotation about a third vertical axis. Besides relative displacement, contact pressure of the abrasive belt on the work piece can be varied by a supplementary cam acting on the contact wheel 45 instead of the pre-stressing spring 45. A further cable, similar to cable $21_2$, can be used to positively project the wheel 44 out of the position shown in FIG. 11 and towards the work piece I with pre-determined force. The time of application of the belt at a pre-determined surface of the work piece can be varied simply by modifying the profile of the cam C2.

In the preferred form, each work head has a separate motor $M_b$ (FIG. 12) which is connected to pulley 42 driving the belt. To provide additional flexibility, the other pulley 41 has a bowed rim (see FIG. 12) so that its axis of rotation may be inclined about a shaft axis 47 (FIGS. 12, 13) to provide a certain transverse deflection to the working surface of the belt engaging the work piece. This inclination of the pulley 41 can be regulated by a screw 48 (FIG. 12) which engages an arm 49 and bears more or less against arm 49. Arm 49 is fixed to pivot 47, to which the shaft 50, about which pulley 41 rotates, is secured. Preferably ball bearings are interposed between shaft 50 and pulley 41.

In certain applications it may be desirable to start the grinding operation only when the work piece I has reached a certain pre-determined position. This can be obtained by controlling motor $M_b$ by a cam-control switch, the cam rotating in synchronism with cams C1, C2, C3. Alternatively, each motor $M_b$ can start as soon as a work piece reaches a properly indexed position, for example, by means of a switch controlled by the indexing mechanism. To prevent start-up shock on the motor, and on the work tools carried by the tool carrying heads, such as belt 40, the motor is mounted on the support of the tool head by means of a resilient spring mounting. A spring 51 is interposed between the structure of the tool head and arm 52, which is connected to a spring pin (FIG. 13), arm 52 being linked to the motor support 53. Upon starting of motor $M_b$, the spring can compress and thus dampen start-up shocks and prevent transfer of application of sudden counter-torques to the structure of the tool heads and their supports connected to the machine.

In the apparatus of the present invention, cams are provided to cooperate with cam followers, for example, carried on bowed levers partly surrounding the cams. The bowed levers are turnable about a fixed pivot, change of position of the cams being transmitted to the levers which, by means of intermediate transmission members, such as links, Bowden cables and other inter-engaging elements, transmit motion to the work carrying spindle as well as to the working heads located about the circumference of the turret table. The work carrying spindle is rotatably mounted, to rotate about its axis. The machining heads are mounted for translation, or rotational movement, about two or more axes, different from the axis of rotation of the work carrying spindle. The cams, of which two or more are required, control on the one hand the operation of the spindle and on the other the work heads. The work head itself may be controlled by more than one cam and a suitable interconnection is the Bowden cable noted. Other interconnections may be used, such as chains, links, or pneumatic or hydraulic controls. Likewise, electric position controllers and servo mechanisms may be employed, depending upon the movements which the work piece is to follow. The interconnection between the cam follower controlling the spindle and the spindle itself has to be specially arranged since the spindle indexes with indexing movement, from work station to work station of the turret table. Additionally, the movement of the spindle itself is to be controlled, successively, by cams which may be different and have different shapes so that the machining at different work stations will act on different surfaces of the work piece.

The special interconnection between the cams controlling the attitude of the work piece and the work head is provided by the movable rail G (FIG. 8). This rail can be telescoped and articulated by the levers L, under control of cam C3. Interconnection between the rail, and thus with the levers L to the spindles B is provided by the runner 25, the rail elements 27, 27' providing for guidance of the runner from a position above or close to the articulating element 28 to the next articulating element, upon indexing of the turret table R. The specific position of the articulating element, at any particular instant of time, is governed by cam C3, transfer of motion from the cam over level L, element 28, straddling runner 25 and lever 31 being transferred to the spindles B. Interconnection from the levers 31 to the spindle can be by the chain and sprocket arrangement as shown, or by another interconnection, for example, a Bowden cable, a rack and pinion arrangement, or other motion transfer system. Upon indexing of the table, the runners 25 glide over the rail sections formed of elements 27, 27' until they are adjacent the next working position and close to an operating element 28. The telescoping arrangement of the rails permits deflection and movement of the rails upon movement of the interconnecting wing-shaped elements 28. Thus, motion transfer from the cams, stationery with respect to the turret plate, to the spindles is provided regardless of motion of the turret plate and the positions, at any instant of time, of the cams and the cam follower levers L.

The work heads may be of any kind desired, the belt grinding head being shown merely as an example. Preferably, each working head has its own electric driving motor. Suitable working heads may be drills, milling heads, grinders with grinding wheels or belts, as shown, or any other machine tool to be brought in contact with a work piece. Non-contacting work heads may also be used, such as spray guns for painting, for spraying or application of abrasive materials. The spindles themselves are preferably arranged so that the work pieces can be readily placed thereon, fixed in position and removed from the spindles.

The present invention has been described specifically in connection with a machine tool turret in which a work piece can be presented at varying attitudes to working heads, so that irregular surfaces can be machined in various positions. Various changes and modifications may be made within the scope of the inventive concept and to meet specific operating requirements or to permit the application of special tools or structures and applying their working surfaces to the work piece.

I claim:

1. Programmed contouring machine for machining, by a machine tool head, irregularly shaped work pieces (I) comprising a turret table (R), said table being mounted for indexing movements, in steps, to present selected work pieces at pre-determined work stations (P1–P6) adjacent the circumference of the turret table, each station being equipped with a machine tool head;

a plurality of work piece spindles (B) spaced along the periphery and extending from said turret table (R) to carry the work pieces;

at least two cam and cam follower means (C1, C2, 19, C3, 23) and a common cam shaft (H) associated with each work station and fixedly located with respect to each work station, one of the cams at each work station being shaped to control movement of the spindle (B) when indexed for the specific station in a pre-determined manner, as determined by the contour of the work piece, and another cam controlling alignment of the machine tool head (40, 41, 42) with the work piece on the spindle about an axis other than the axis of the spindle (B);

and means (25, 31) connected to each spindle (B) and travelling with the turret table and selectively and progressively engaging said one cam and cam follower means at each work station, whereby the work piece will be presented to the work head in attitudes required by its contour and individual for each work station.

2. Machine according to claim 1 including a common drive (15, 16) interconnecting all the cam shafts (H) of the machine to drive all said cam shafts synchronously.

3. Machine according to claim 2 wherein the common drive and the indexing means are driven by a common motor (M) to provide for synchronous indexing and cam movement of said cam-cam follower combination.

4. Machine according to claim 3 wherein the ratio of transmission of the common motor provides for one revolution of the cam shaft for each indexing step of the turret table.

5. Machine according to claim 1 wherein the indexing means (FIG. 2) comprises a ratchet (6, 7, 8) and a push rod (5) engaging the ratchet;

spring means (4) tending to push the rod in a direction to transfer indexing movement to the turret table;

a motor (M) and a cam (1) driven by the motor;

means (2, 2', 3, 9, 10) interconnecting the spring (4) and the cam (1) to progressively stress the spring upon rotation of the cam when driven by the motor;

and a sear releasing the spring to operate the ratchet.

6. Machine according to claim 5 wherein the time duration which the motor turns the cam to stress the spring corresponds substantially to the working time of the working heads of the work stations, whereby the spring is stressed progressively during the period of the intervals between indexing movements.

7. Machine according to claim 1 wherein the means connected to each spindle and travelling with the turret table to engage said one cam means at each work station comprises a non-indexing closed loop track (27, 27', 28) formed of mutually shiftable elements;

means (28, 31, 31b, 33, 35) transferring a representation of the specific position of a track element, with respect to the periphery of the turret table, to the work piece spindle (B) and thus determined spindle rotation;

and lever means (L) engaging said one cam means (C3) and the elements of said track (28) to determine the position of at least some of said elements with respect to the periphery of the turret table in accordance with the shape of the cam means engaged by the lever means.

8. Machine according to claim 7 wherein the means transferring a representation of a specific position of the track elements comprises a runner (28) engaging the track;

and linkage means connected to said runner and to the spindle (B) and transferring a representation of instantaneous position of the runner on the track, and movement of the track upon rotation of the cam means to the spindle.

9. Machine according to claim 7 wherein the lever means engaging said one cam means and said track comprises a bowed lever (L) partially surrounding said one cam means (C3) and engaging said cam means in a central region of said lever means;

said lever means being mounted for swinging movement at one end and engaging an element of said track with another end to determine the position of the shiftable elements thereof.

10. Machine according to claim 1 wherein (FIGS. 11 to 13) at least one of the machine heads is a grinding station, comprising an endless grinding belt (40), tensioning pulleys guiding said driving belt in a pre-determined path;

and drive means coupled to drive the endless belt.

11. Machine according to claim 10 wherein a tensioning pulley (42) is provided, mounted swingable about a fixed axis transverse to its axis of rotation;

one other of said cam means (C1, $21_1$) controlling the extent swing of said tensioning pulley about said fixed axis and being connected thereto.

12. Machine according to claim 11 wherein another of said pulleys (41) is crowned and swingable about an axis transverse to the axis of rotation and in a plane non-parallel with respect to said fixed axis, to provide for deflection of the grinding belt with respect to the spindle (B).

13. Machine according to claim 11 including a third cam and cam follower means (C2, $19_2$), said third cam follower means controlling the operation of said grinding belt.

14. Machine according to claim 10 wherein the drive means comprises an individual motor drive ($M_b$) for the belt, the motor of said motor drive being spring mounted to absorb shocks upon starting.

15. Machine according to claim 1 including means ($19_1$, $19_2$; $21_1$, $21_2$) interconnecting the cam follower means of at least one of said cam means with the machine tool head to position the machine tool head in predetermined alignment with respect to a work piece (I) on said spindle, the instantaneous alignment of said machine tool head being determined by the instantaneous position and shape of the associated cam acting on said cam follower.

16. Machine according to claim 15 wherein the interconnection between said cam follower and said machine tool head comprises a Bowden cable.

* * * * *